United States Patent [19]

Simmons

[11] Patent Number: 4,730,365

[45] Date of Patent: Mar. 15, 1988

[54] POULTRY NECK BREAKER ASSEMBLY

[76] Inventor: Lacy Simmons, 101 Simmons Industrial Blvd., Dallas, Ga. 30132

[21] Appl. No.: 923,264

[22] Filed: Oct. 27, 1986

Related U.S. Application Data

[60] Continuation-in-part of Ser. No. 761,424, Aug. 1, 1985, Pat. No. 4,619,017, which is a division of Ser. No. 517,811, Jul. 27, 1983, Pat. No. 4,550,473, which is a division of Ser. No. 284,087, Feb. 16, 1981, Pat. No. 4,532,676, which is a continuation-in-part of Ser. No. 873,370, Jan. 30, 1978, abandoned.

[51] Int. Cl.$^4$ ............................................. A22C 21/00
[52] U.S. Cl. ....................................................... 17/12
[58] Field of Search ...................................... 17/12, 11

[56] References Cited

U.S. PATENT DOCUMENTS 4,035,867 7/1977 Meyn ...................................... 17/11

Primary Examiner—Willie G. Abercrombie
Attorney, Agent, or Firm—Eric P. Schellin

[57] ABSTRACT

The present invention is directed to a neck breaking assembly for a poultry processing operation wherein the bird's neck is first aligned and positioned into an identifiable location adjacent to a breaker block. The breaker block is then projected towards the bird breaking the neck of the bird against a V-shaped aligning and positioning assembly which serves as an anvil for the breaker block. The projected breaker block is then withdrawn downwardly separating the severed neck from the bird and stretching the remaining neck skin.

3 Claims, 7 Drawing Figures

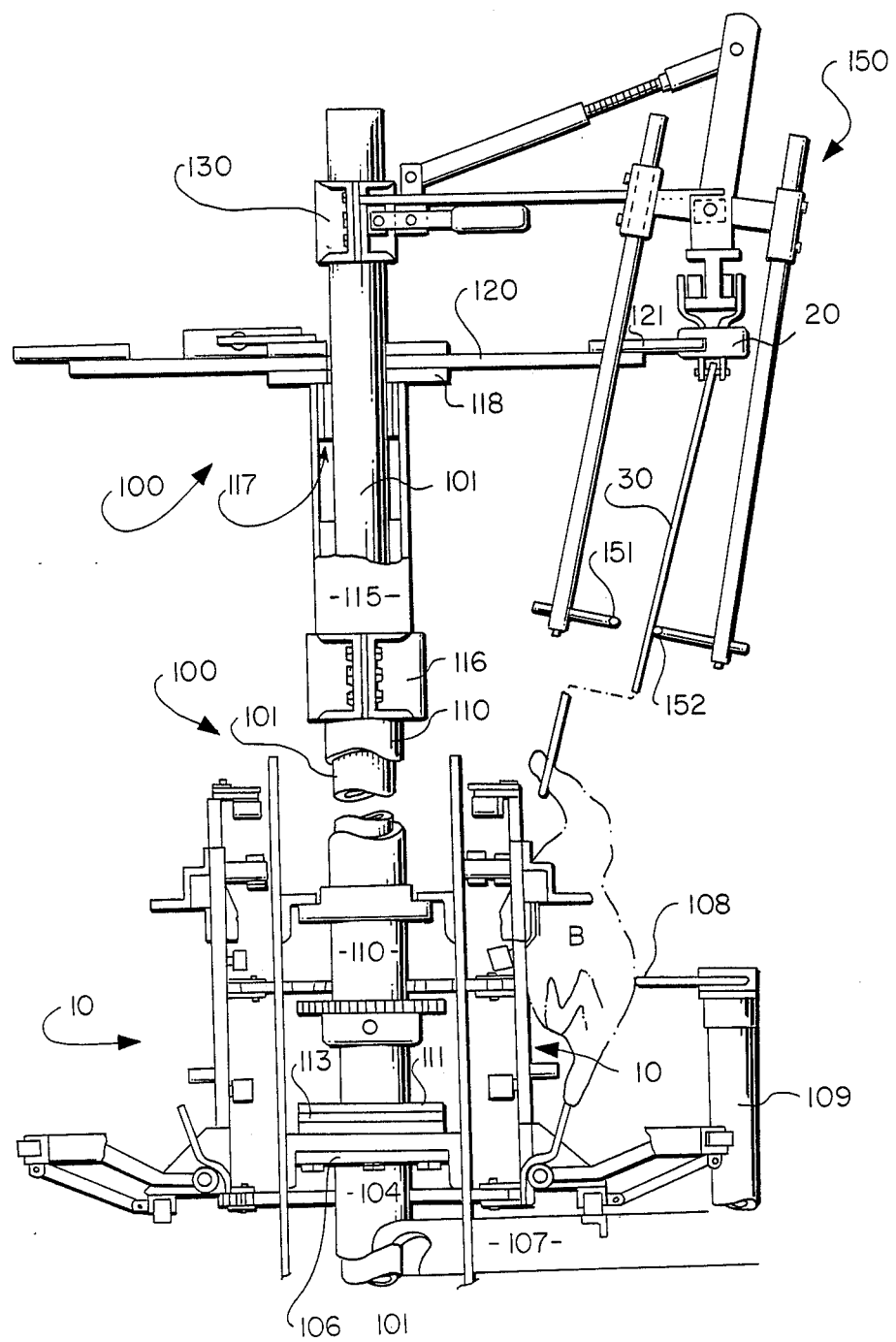

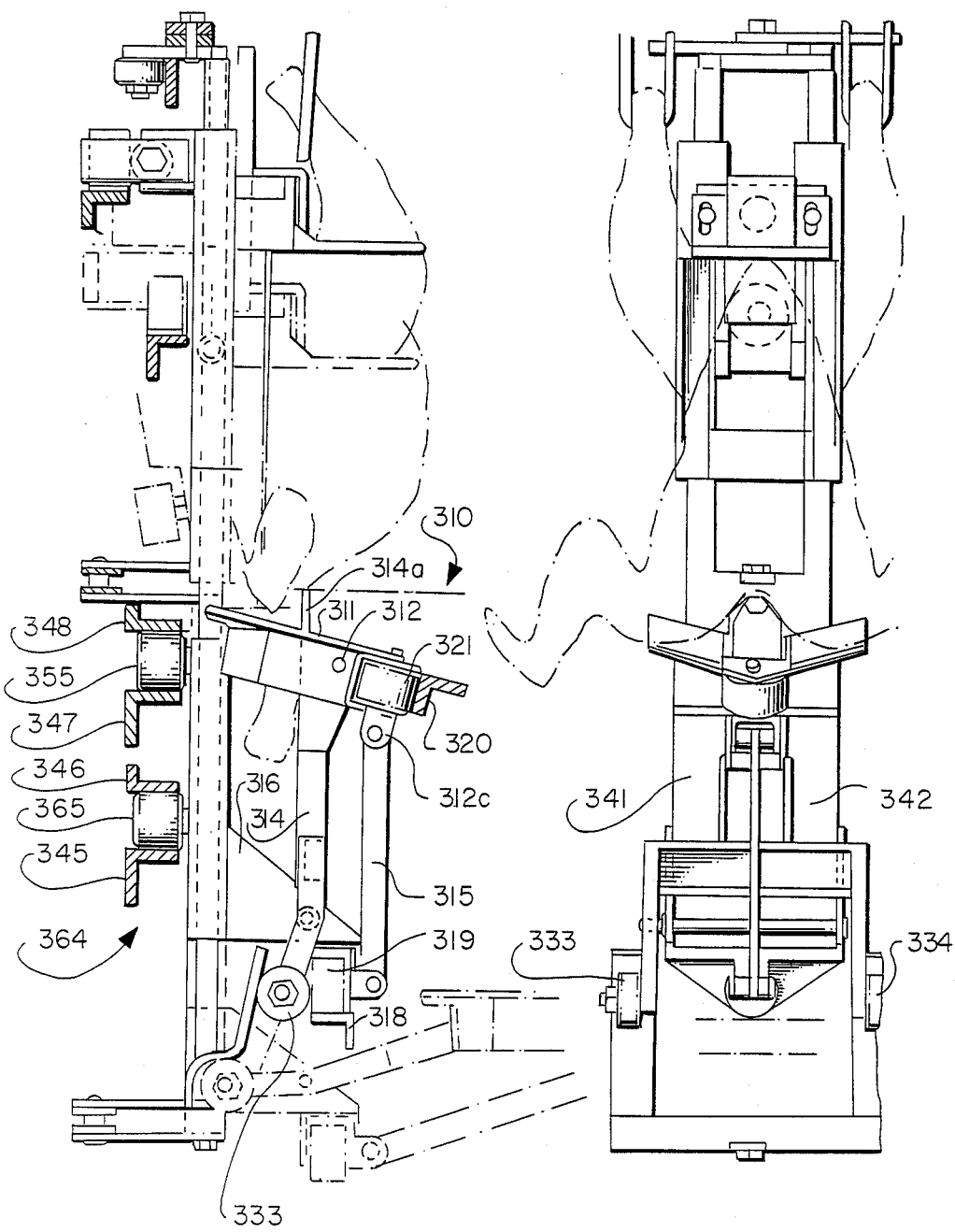

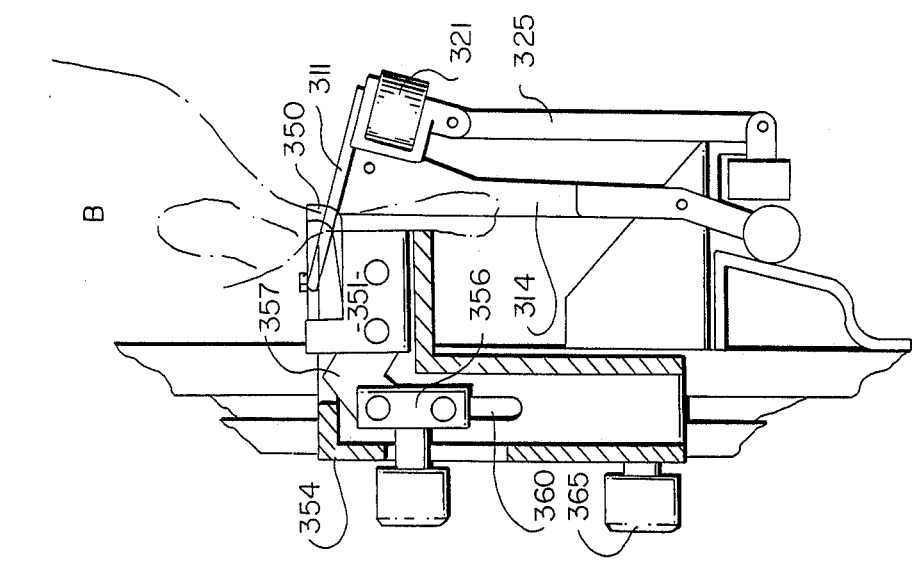
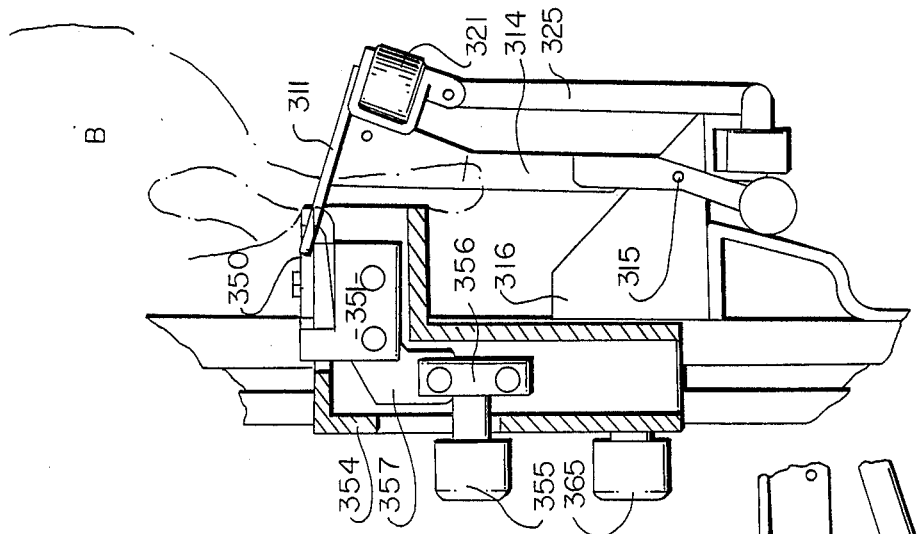
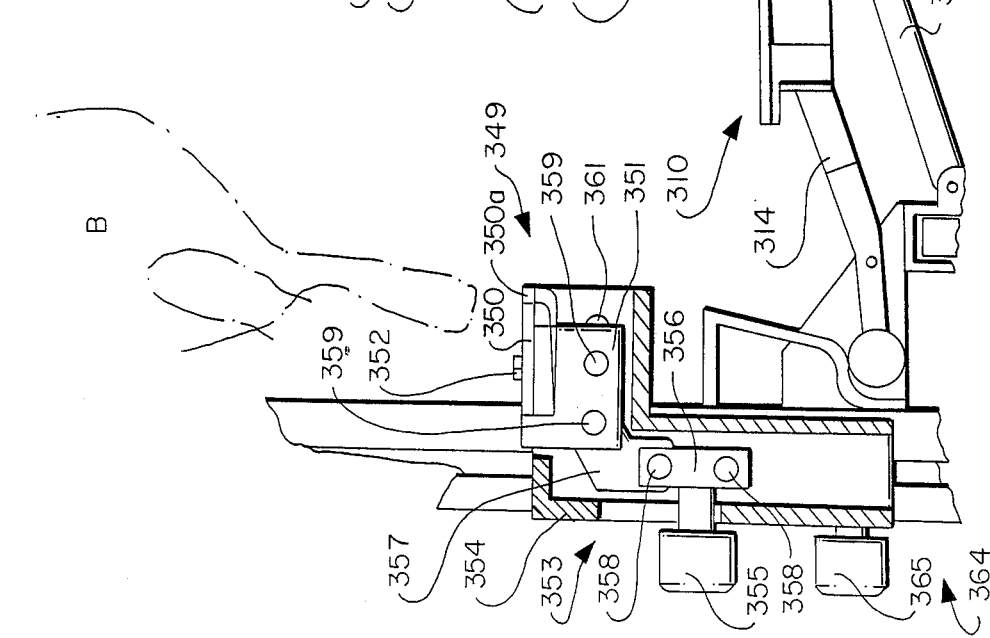

POULTRY NECK BREAKER ASSEMBLY

The present patent application is a continuation-in-part of U.S. patent application Ser. No. 761,424, filed: 8-1-85, now U.S. Pat. No. 4,619,017, which is a divisional application of Ser. No. 517,811 filed 7-27-83, now U.S. Pat. No. 4,550,473 which is a divisional application of application Ser. No. 284,087 filed 2-16-81, now U.S. Pat. No. 4,532,676 which is a continuation-in-part of U.S. patent application Ser. No. 873,370, filed: 1-30-78, abandoned.

BACKGROUND OF THE INVENTION

1. Field of the Invention:

The invention is directed to a poultry processing apparatus and more specifically to an improved neck breaker assembly. The neck is held in place against a neck breaking block by a pivotable V-shaped aligning and holding assembly. The block is then projected against the neck, breaking it, without completely severing the neck skin. The severed neck is then drawn downwardly away from the bird stretching the neck skin and exposing the neck to further processing.

2. Description of the Prior Art:

The applicant in a previous patent, U.S. Pat. No. 4,532,676, which is incorporated herein by reference, disclosed a neck breaking assembly wherein the V-shaped aligning and holding means is pivoted against the breaker block to break the bird's neck. The block is then drawn downwardly to separate the neck from the bird while stretching the neck skin and exposing the neck to further processing. Although this assembly has been very successful, it has been found that with larger bird's the neck breaking operation puts a great deal of stress on the V-shaped aligning and holding means. To overcome this problem the present invention was developed as an improvement over the previous neck breaker assembly and is particularly adaptable for larger bird's. Like the previous neck breaker assembly disclosed in my prior patent, the improved assembly is readily adaptable to the support module disclosed in this patent.

SUMMARY

In the present invention the bird is captured and positioned in the module by a V-shaped aligning and holding means which positions the bird's neck against a breaker block. The V-shaped aligning and holding means is held in place by a roller moving along a track, and acts as the anvil for the breaker block. The breaker block is then projected horizontally against the bird's neck by a projecting means breaking the bird's neck. The breaker block is then drawn downwardly by a drive means separating the neck from the bird, stretching the neck skin and exposing the neck to further processing. The V-shaped aligning and holding means then releases the bird allowing the module to be returned up the poultry processing line for handling another bird.

The breaker block is mounted on a breaker block support which is adapted to move horizontally in a support frame mounted on the module. The breaker block support is provided with pins which are received in a pair of horizontal slots located in the support frame which guides the horizontal movement of the breaker block support and thereby the breaker block. The horizontal projecting means for the breaker block comprises a vertically movable cam follower having a cam follower support that is movably mounted in a pair of vertical slots located in the support frame in a manner similar to the breaker block support. A V-shaped link operatively couples the cam follower support to the breaker block support so that upon the upward movement of the cam follower support the breaker block is projected forward breaking the neck of the bird.

The support frame is provided with a cam follower and is vertically movable on the support module for drawing the outwardly projecting breaker block downwardly to separate the broken neck from the bird and stretching the neck skin accordingly, to expose the neck to further processing.

BRIEF DESCRIPTION OF THE DRAWINGS

FIG. 1 is a fragmentary side view of the invention partially in cross-section showing side views of the modules of the invention.

FIG. 2 is a side view of the module and specifically the neck breaker assembly.

FIG. 3 is a front view of the module and specifically the neck breaker assembly.

FIGS. 5, 6 and 7 are in sequence and are fragmentary cross sectional views of the neck breaker assembly in operation.

DETAILED DESCRIPTION

Figure 4:
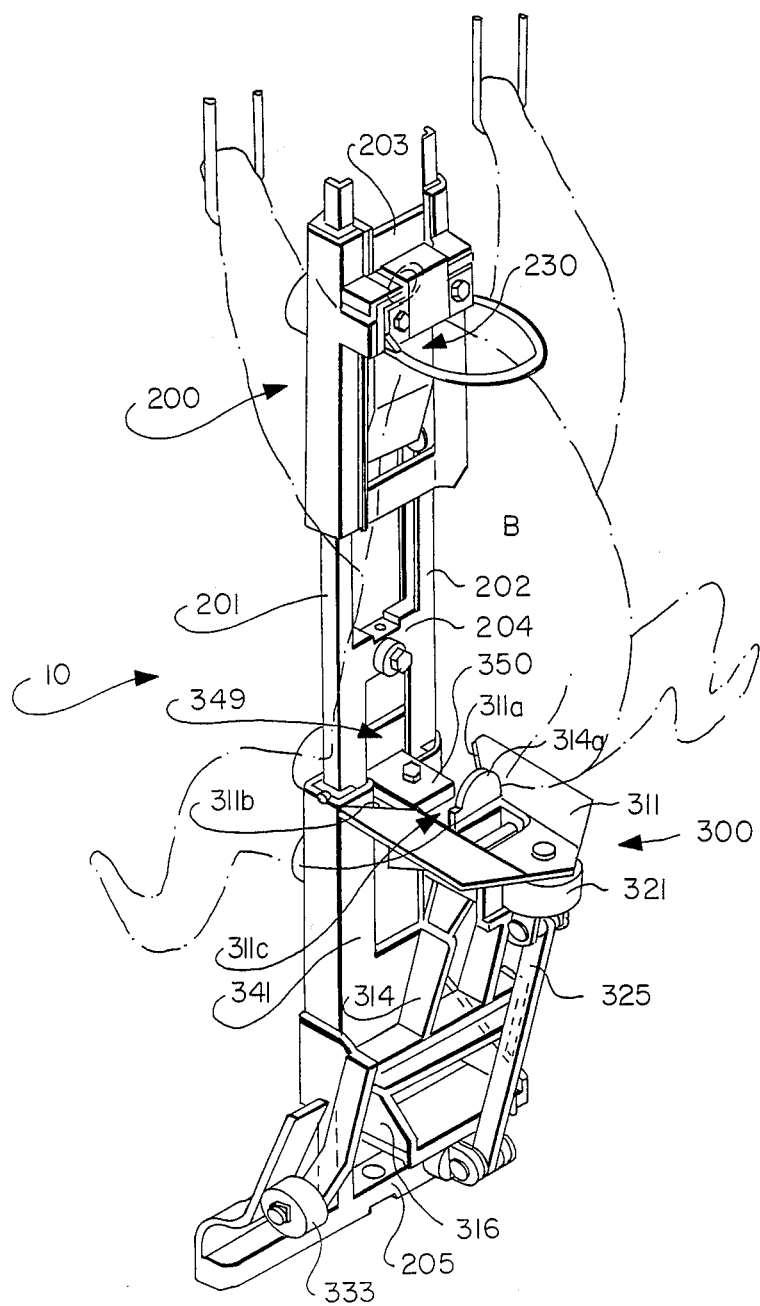
FIG. 4 is a perspective view of the module.

It should be noted initially, that the neck breaker assembly of the present invention is adapted to be mounted on a support module that is mounted together with other support modules on a conveyor line adjacent to the path of a poultry processing line. The structure of the conveyor and its drive assembly are better illustrated and disclosed in U.S. Pat. No. 4,532,676, incorporated herein by reference, and as such will only be briefly discussed as they relate to the improved neck breaker assembly to which this present invention is directed.

As illustrated in FIG. 1 support modules 10 are mounted on module support and drive mechanism assembly 100. The frame support portion of assembly 100 comprises single post 101 which is mounted to the floor. Pipe element 104 is fitted over post 101 and is provided with bearing plate 106. Fitted above pipe 104 is pipe 110 which is provided with bearing plate 111 which rests on bearing member 113 resting on bearing plate 106. Pipe element 115 is journalled around pipe post 101 and secured to pipe 110 by clamp 116. The upper end of pipe 115 is provided with bearing sleeve 117 which is fitted between post 101 and pipe 115.

Plate 118 is fixed to the upper end of pipe 115 and is provided with drive wheel 120. The drive wheel is provided with radially extending lugs 121 which engage shackle support assemblies 20 so that the poultry processing line effects the rotary movement of drive wheel 120 and thereby pipes 115 and 110.

Guide means 150 is secured to post 110 by clamp assembly 130 and is provided with a pair of guide bars 151 and 152 that direct poultry supporting shackles 30 to modules 10. In addition support arm 107 is fixed to pipe 104 and is provided with vertical portion 109 having guide 108 that directs bird B hanging from supporting shackle 20 to module 10. As such when the guide means 150 is positioned as illustrated in FIG. 1, the shackles 30 supporting the birds will be advanced in a path adjacent to the modules 10.

The module 10, as best shown in FIG. 4 is provided with channel shaped frame elements 201 and 202 that are supported in spaced relationship by transverse connecting bars 203, 204 and 205 thereby forming a module support means.

Oil sac removal assembly 200 is provided with an apertured pressure plate 230 that is pressed against the oil sac of the bird and upwardly drawn against a positioning block to peel away the oil sac. The oil sac removal operation is done simultaneously with the neck breaking operation, and is disclosed in greater detail in U.S. Pat. No. 4,532,676 incorporated herein by reference.

Neck breaking assembly 300 comprises V-shaped bird neck aligning and holding means 310 (FIG. 2) and neck severing means 349 (FIG. 4). The aligning and holding means 310 includes plate member 311 having outwardly diverging aligning surfaces 311a and 311b which are designed to engage, guide, horizontally align, and hold the bird's neck in neck breaking chamber 311c. Alignment plate 311 is pivotally supported by pin means 312 adjacent to the upper end of support arm 314. Support arm 314 is pivotally supported at 315 on support bracket 316.

An upper extended end of the support arm 314 includes a shaped surface 314a detailed to engage the breast bone of a bird to assist in alignment of the bird. The alignment plate 314 and alignment surface 314a are adjustable between a pivoted open bird disengaged position and closed bird engaged position by the pivotal movement of support arm 314.

Arm 314 and plate 311 are controlled by movement between the opened and closed positions by cam track 320 (FIG. 2) mounted on vertical portion 109 (FIG. 1) supported for operative engagement with roller 321 supported on the back of plate 311. Additional angular adjustment of the parallelogram linkage is effected for operative engagement with a pair of rollers 333 and 334 (FIG. 2) supported on the lower ends of the extended portions of arm 314. The neck breaking alignment assembly 300 is supported for vertical sliding movement along module frame elements 201 and 202 (FIG. 4) by a pair of complementary channel shaped elements 341 and 342 supported on channels 201 and 202, respectively. Bracket 316 is fixed to channels 341 and 342 and together with elements 341 and 342 forms a vertically adjustable mounting assembly for the neck breaking assembly. The mounting assembly and its supported alignment mechanism is moved vertically relative to the supporting module by cam track 318 effecting roller cam follower 319 mounted beneath the base of bracket 316.

As illustrated in FIGS. 5, 6 and 7, the neck severing means 349 comprises breaking block 350 which is mounted on breaker block support 351 by bolt 352. Block 350 is detailed in shape to fit within the neck breaking chamber 311c formed in plate 311. Block 350 includes an extended severing edge 350a.

After the bird's neck is engaged and held by the holding and aligning means, breaking block support 351 and breaking block 350 are projected horizontally forward towards the neck by projection means 353. The breaker block, breaker block support and the projecting means are operatively mounted in support frame 354 which is vertically slidably mounted on the mounting assembly. Projecting means 353 comprises roller cam follower 355 which engages cam tracks 347 and 348 and is mounted on cam follower support 356; and V-shaped link 357 which is pivotally coupled to both cam follower support 356 and breaker block support 351. Both supports 356 and 351 are provided with outwardly projecting pins 358 and 359, respectively, which are slidable engaged in slots 360 and 361, respectively. Slots 360 and 361 are formed in both sides of the support frame and provide guides for the movement of the supports. As is apparent from the drawings, cam support 356 can only move vertically in slot 360 whereas breaker block support 351 can only move horizontally in slot 361. Therefore V-shaped link 357 translates the vertical movement of the cam follower 355 and cam follower support 356 into horizontal movement for breaker block support 351 and breaker block 350. It should be appreciated that the aligning and holding means forms an anvil for the breaker block by being held in position by cam track 320 engaging supporting roller 321, as shown in FIG. 2.

Support frame 354 is vertically movable relative to the mounting assembly, and is provided with driving means 364 for vertically positioning the support frame. Driving means 364 comprises roller cam follower 365 that is mounted to the support frame and engages cam tracks 345 and 346. Driving means 364 drives support frame 354 and breaker block 350 downwardly after the breaking operation to thereby separate the severed neck from the bird and stretching the neck skin exposing the neck to further processing operations. Both cam follower 355 of the projecting means and cam follower 365 of the driving means are vertically manipulated by cam tracks mounted to module support and drive assembly 100.

After the neck breaking operation, the bird is released and the support module returned up the poultry processing line to process another bird. During this return step the support frame 354 is returned to its initial starting position and the breaker block 350 is withdrawn. In addition the assembly is washed by a washing means to remove any particles from the neck breaking operation.

The subject invention should not be limited by the above described and illustrated embodiments, but rather should be limited solely by the claims that follow.

I claim:

1. A poultry neck breaker assembly, said assembly including a module (10) having a support frame (354), means for mounting said support frame for vertical sliding movement on said assembly, a breaking block (350) carried by said support frame, a cam follower (355) mounted in said support frame for vertical sliding movement thereon, and link means (357) connected between said cam follower and said breaking block for moving said breaking block horizontally upon vertical movement of said cam follower.

2. An assembly as defined in claim 1 wherein said breaking block (350) includes a breaking block support (351), pin means (359) carried by said breaking block support and extending outwardly therefrom, slot means (361) formed in said support frame (354) and said pin means being disposed within said slot means for horizontally guiding said breaking block in said support frame.

3. An assembly as defined in claim 1 wherein said cam follower (355) includes a cam follower support (356), pin means (358) carried by said cam follower support and extending outwardly therefrom, slot means (360) formed in said support frame (354) and said pin means being disposed within said slot means for vertically guiding said cam follower support in said support frame.

* * * * *